United States Patent [19]

Warnken

[11] 4,009,224
[45] Feb. 22, 1977

[54] EPOXY RESIN POWDER INCLUDING ETHYLENE VINYL ACETATE

[75] Inventor: Gerald H. Warnken, Cottage Grove, Minn.

[73] Assignee: Minnesota Mining and Manufacturing Company, St. Paul, Minn.

[22] Filed: Aug. 11, 1975

[21] Appl. No.: 603,702

[52] U.S. Cl. .......................... 260/837 R; 260/836; 428/418

[51] Int. Cl.² ...................................... C08G 45/04

[58] Field of Search ............ 260/836, 837; 427/195

[56] References Cited

UNITED STATES PATENTS

| | | | |
|---|---|---|---|
| 3,578,615 | 5/1971 | Moore et al. | 260/18 |
| 3,626,026 | 12/1971 | Fukumara et al. | 260/836 |
| 3,661,828 | 5/1972 | Fellers et al. | 260/830 TW |
| 3,684,778 | 8/1972 | Hammer | 260/836 |
| 3,707,583 | 12/1972 | McKown | 260/47 EN |
| 3,758,633 | 9/1973 | Labana et al. | 260/836 |

*Primary Examiner*—Theodore E. Pertilla
*Attorney, Agent, or Firm*—Alexander, Sell, Steldt & DeLaHunt

[57] ABSTRACT

Stable, free-flowing epoxy resin powder which fuses to and cures upon striking an object which has been preheated to the curing temperature of the composition to provide a tough protective coating. The composition of the powder differs from the prior art in that it includes 3–30 parts of a copolymer of 2–50% vinyl acetate and 5–75% ethylene per 100 parts of the epoxy resin. The copolymer improves the flexibility of the cured coatings.

6 Claims, No Drawings

EPOXY RESIN POWDER INCLUDING ETHYLENE VINYL ACETATE

FIELD OF THE INVENTION

This invention concerns epoxy resin powder used to provide protective coatings, especially for petroleum pipelines.

BACKGROUND OF THE INVENTION

Thermosetting epoxy resin powders are widely used to provide protective coatings, especially for steel pipe. The coatings may be applied by blowing the powder onto pipe which has been preheated to a temperature above the softening point of the powder so that the powder fuses and adheres to the pipe. The pipe may then be carried to an oven to cure the resin, or if the pipe contains sufficient heat, the resin fully cures before the pipe has cooled to room temperature.

The cured coatings should be sufficiently adherent and flexible to withstand the bending and impact to which the pipe or other substrate may be subjected during shipment and installation. Insufficient flexibility becomes especially troublesome in cold weather. In use, the cured coatings should be resistant to the most adverse conditions that may be encountered. For example, cured coatings are subject to disbondment due to the cathodic protection which is commonly applied to buried pipe, a condition aggravated in hot service, especially when the pipe is buried in moist ground.

For commercial utility, it is necessary that the uncured powder be stable at room temperature. Upon striking the heated substrate, the uncured powder must fuse and flow sufficiently to provide pinhole-free coatings, but should cure to a thermoset state quickly at moderately elevated temperature to permit the coatings to be applied at reasonably high rates of production. For some applications the coating should harden at the curing temperature sufficiently to permit handling within ten seconds, although longer times are satisfactory in many applications.

Protective coating powders which generally satisfy the foregoing criteria are known in the prior art. For example, the epoxy resin powders of U.S. Pat. No. 3,578,615 (Moore) provide protective coatings having improved flexibility and resistance to cathodic disbondment. The epoxy resin powder of U.S. Pat. No. 3,876,606 (Kehr) is equally good in such respects while providing extraordinarily good resistance to boiling water, an important property for pipe which is to be buried in moist ground and used to convey hot fluids. Nevertheless, there has been a continuing need for further improvement in flexibility, especially at sub-freezing temperatures.

Although flexible thermoplastic materials such as butadiene/acrylonitrile copolymers have been used in epoxy resin powders to improve the cured flexibility, such modifications have primarily concerned powdered epoxy adhesives, e.g., U.S. Pat. No. 3,707,583 (McKown). It has generally been believed that protective coatings including unreacted thermoplastic materials would be deficient in impact resistance and in resistance to cathodic disbondment. Accordingly efforts to incorporate flexibilizers have usually involved those which form chemical bonds with an ingredient of the epoxy resin composition. For example, U.S. Pat. No. 3,639,345 (Whittemore) pre-reacts polyethylene or polypropylene glycol with the anhydride curing agent. Such procedures can be difficult and expensive.

Recently the company to which this application is assigned sold epoxy resin powder comprising 100 parts of a polyglycidyl ether of a polyhydric phenol having a softening point of 70°–150° C. and 5–10 parts by weight of a copolymer of acrylonitrile, i.e., "nitrile rubber", plus latent hardening agent and accelerator. This powder provided protective coatings which had improved flexibility and were equivalent in other respects to less-flexible coatings of the prior art except that the nitrile rubber inhibited flow-out so that the coatings were rough and, if thin, contained pinholes.

OTHER PRIOR ART

U.S. Pat. No. 3,641,195 (Ball) concerns structural adhesives which are chemically closely related to the protective coating powders of the present invention. Of special interest are Compositions (d), (h) and (i) of Table I, each of which consists of approximately equal parts of liquid and solid epoxy resin, a latent hardening agent for epoxy resin (dicyandiamide), a latent catalyst for accelerating reaction between the epoxy resin and hardening agent (imidazole) and a copolymer containing 39–42% vinyl acetate units and 58–61% ethylene units. There is no suggestion in the Ball patent that such a structural adhesive might be pulverized to provide a protective coating powder.

THE PRESENT INVENTION

The powder of the present invention is shelf-stable (i.e., room-temperature stable) and provides cured protective coatings that exhibit extraordinarily good flexibility, especially at sub-freezing temperatures, while affording other protective properties equal to results with epoxy resin powders now on the market. As with most protective coating epoxy resin powders now on the market, the novel powder comprises a polyglycidyl ether of a polyhydric phenol having a softening point (Durrans') of 70°–150° C, a normally solid latent hardening agent for epoxy resin, and a latent catalyst for accelerating reaction between the polyglycidyl ether and the hardening agent.

The improved flexibility is realized by including one or more copolymers, each of which is a copolymer of monomers comprising by weight 2–50% vinyl acetate and 5–75% ethylene, preferably 25–50 weight percent vinyl acetate and 50–75 weight percent ethylene. Surprisingly, the presence of the copolymer or copolymers appears to involve the additional improvement of better flow characteristics, thus tending to avoid coating imperfections which have occurred using powder of identical compositions except for omission of the copolymer or copolymers. For optimum flow characteristics, the melt index of the copolymer or combined melt index of the copolymers should exceed 5. At a melt index above 400, significant improvement in bendability has not been attained. Cured coatings having both good flexibility and freedom from coating imperfections are most readily attained by employing one or more copolymers of ethylene and vinyl acetate which have a melt index or combined melt index of 20–200.

In addition to vinyl acetate and ethylene, the copolymer may be based on up to 60 weight percent of other copolymerizable monomers which do not interfere with the dispersibility into and the stability of the uncured epoxy resin composition, e.g., vinyl chloride and/or very small amounts of organic acids such as maleic acid or acrylic acid. However, best results have been attained where more than 98 weight percent of the monomers are ethylene and vinyl acetate.

Improved flexibility is observable from the use of only three parts of ethylene-vinyl acetate copolymer per 100 parts by weight of polyglycidyl ether. Increased amounts of copolymer produce cured coatings of even greater flexibility, but at over 30 parts, other desirable performance levels may not be realized. For most purposes, 3 to 10 parts of copolymer are preferred. At over 10 parts, it may be necessary to take steps to avoid stickiness in the uncured composition, as by employing a polyglycidyl ether which has a softening point of at least 90° C or by incorporating a fluidizing aid such as fumed silica. Stickiness must be avoided so that the composition can be pulverized to provide a free-flowing powder, most of which will pass a screen having 180-micrometer openings.

The preferred polyglycidyl ethers are those obtained by condensing epichlorohydrin and 2,2'-bis(hydroxyphenyl)propane (bisphenol A). Other polyhydric phenols which provide usefully high-melting polyglycidyl ethers include phenol novolaks and ortho-cresol novolaks. For convenience in obtaining a blend of the ethylene-vinyl acetate copolymer and a high-melting polyglycidyl ether, it is preferred to begin with a mixture of the copolymer and a liquid polyglycidyl ether together with materials for advancing the polyglycidyl ether to a molecular weight providing a softening point of 70° C or more, after which the hardening agent and catalyst are added.

The novel powder may employ any latent hardening agent known to provide room-temperature-stable epoxy coating powders. Among these are methylene dianiline, dicyandiamide and dihydrazindes of the formula

where R is a divalent hydrocarbon radical of at least two carbon atoms, preferably at least four carbon atoms. Adipic, azelaic and isophthalic dihydrazide are particularly useful. Any anhydride disclosed in U.S. Pat. No. 3,578,615 (Moore) may be used, especially trimellitic anhydride and adducts thereof.

For most applications, the latent catalyst should be so selected that the composition will harden at ordinary curing temperatures (usually 185°–250° C) at a rate permitting the coated object to be handled within a minute or even as soon as a few seconds. When using trimellitic anhydride, stannous octoate is a particularly suitable catalyst.

Various additives such as flow control agents and pigments and other fillers can be added for the same purposes and effect as they are used in epoxy coating powders of the prior art.

TESTING

Except as otherwise indicated below, specimens for testing are made by coating a steel panel or bar which has been sandblasted, degreased and then preheated in an oven to about 230° C. Powder is blown onto the panel and fuses to provide a coating of about 0.3 mm in thickness which is cured by residual heat in the steel without any post-heating, except that the panels for the Impact Test were returned to the oven for three minutes because they did not hold sufficient heat to cure the resin. In all test results reported below, the coating thickness was within the range of 0.25–0.4 mm except as noted.

BEND TEST

A coated steel bar 17.5 × 2.5 × 1.0 cm is bent in the easy direction around mandrels of successively smaller radii, beginning at 30 diameters and decreasing five diameters each time except that a specimen which passes ten diameters is finally tested at eight diameters. A coating which passes eight diameters has exceedingly good flexibility for coating steel pipe. X diameters means that the radius of the mandrel is X times the thickness of the bar. While the coating is wet with tap water, 1500 volts DC are applied across the entire coated surface except at the edges. If an electrical breakdown failure is due to a pinhole in the coating, this is attributed to nonuniform coating, and the test is continued until there is a failure due to cracking or stress marks.

IMPACT TEST

Coated steel panels measuring 7.5 × 7.5 × 0.3 cm, after cooling to room temperature, are placed in the Gardner Impact Tester. A 4-pound (1.8-kg) weight having a striker with a curved end of 1.6 cm diameter is allowed to fall a predetermined distance up to 40 inches (102 cm). Failure is determined as in the Bend Test with the electrode at the impact area.

60° C CATHODIC DISBONDMENT TEST

In a coated steel panel measuring 15 × 15 × 1 cm, a hole 3 mm in diameter is drilled through the coating and 1.5 mm into the panel. A piece of 10-cm plastic pipe is adhesively bonded to the coating to provide a fluid-tight container with the hole at the center of the flat base of the container. The container is filled with an aqueous solution of 1% NaCl, 1% Na$_2$SO$_4$ and 1% Na$_2$CO$_3$. With the container in an oven at 60° C, 6 volts DC are applied between the steel panel and a platinum electrode immersed in the solution to provide cathodic protection. After 7 days, the solution is poured off, and any disbonded resin is scraped away with a sharp knife, leaving an uncoated circle, the diameter of which is measured. Occasionally disbondment occurs outside the drilled hole in the form of blisters or star-like cracks due to coating imperfections.

EPOXY RESINS

"Epoxy Resin A" is a polyglycidyl ether of 2,2'-bis(4-hydroxyphenyl)propane (bisphenol A) having a Durrans' softening point of 95°–105° C and an epoxide equivalent of 870–1025. Such an epoxy resin is presently marketed by Shell Chemical Corp. as "Epon" 1004.

"Epoxy Resin B" is a polyglycidyl ether of bisphenol A having a Durrans' softening point of 8°–12° C and an epoxide equivalent weight of 180–195, e.g., "Epon" 828.

COPOLYMERS I–VI

Copolymers I–VI are copolymers of vinyl acetate and ethylene. Copolymers IV–VI are also based on about 1 percent organic acid monomer, believed to be acrylic acid or maleic acid. Each is available from E. I. duPont de Nemours & Co. under the tradename "Elvax" as indicated in Table I.

Table I

| Copolymer | Approximate Percent by Weight | | Melt Index | "Elvax" No. |
|---|---|---|---|---|
| | Vinyl Acetate | Ethylene | | |
| I | 40 | 60 | 45–70 | 40 |
| II | 33 | 67 | 38–48 | 150 |
| III | 18 | 82 | 455–550 | 410 |
| IV | 28 | 72 | 5–7 | 4260 |
| V | 25 | 75 | 420–580 | 4310 |
| VI | 25 | 75 | 125–175 | 4320 |

EXAMPLE 1

| | Grams | Time of Addition (Minutes) |
|---|---|---|
| Epoxy Resin A | 150 | — |
| Copolymer I | 10.5 | 1 |
| Crystalline silica powder | 21.3 | 5 |
| Flow-control agent (polymerized ethyl acrylate-long chain hydrocarbon sold as "Modaflow") | 0.9 | 5 |
| Catalyst, 2,4,6-tris(dimethylaminomethyl)phenol | 2.0 | 10 |
| Ciba XB 2622 (primarily trimellitic anhydride) | 28.5 | 15 |

Using a two-roll rubber mill, one roll of which was heated by steam to about 100° C while the other was maintained at ambient temperature, the Epoxy Resin A was banded and the other ingredients were added at the approximate times indicated above. Mixing of the catalyst and anhydride was enhanced by making cuts in the banded material and remilling this. After a total of about 18 minutes, the sheet was removed, allowed to cool to room temperture, and ground to a fine powder which was sieved through No. 80 mesh screen (U.S.) having 180-micrometer openings.

Upon striking a steel panel preheated to 205° C, this powder gelled in 7 seconds.

In the 60° C Cathodic Disbondment Test, the disbondment area had a diameter of 1.2 cm, an excellent value. There were no areas of extraneous disbondment.

COMPARATIVE EXAMPLE 1A

Example 1 was repeated except that Copolymer I was omitted for purposes of comparison.

EXAMPLE 2

Example 1 was repeated except reducing the amount of Copolymer I to 7.5 grams.

EXAMPLE 3

Example 1 was repeated except increasing the amount of Copolymer I to 30 grams.

Tests of cured coatings of Examples 1, 1A, 2 and 3 are recorded in Table II.

Table II

| Example | Bend Test (2 or 3 bars tested) | Impact Test (160-inch-pounds) (1.8-kg-m) |
|---|---|---|
| 1 | Passed 8 diameters<br>Failed 8 diameters | Passed |
| 1A | Failed 30 diameters<br>Failed 30 diameters | Failed |
| 2 | Failed 10 diameters<br>Failed 25 diameters | Passed |
| 3 | Failed 8 diameters<br>Failed 10 diameters<br>Failed 25 diameters | Failed |

Although Examples 1 and 2 of the present invention exhibited better resistance to impact than did Comparative Example 1A, cured coatings of the present invention in the Impact Test generally do not outperform, and often are somewhat inferior to, otherwise identical coatings except for omission of any ethylene-vinyl acetate copolymer. On the other hand, the presence of the copolymer invariably produces significant improvement in the Bend Test while retaining reasonably good resistance to impact. It also tends to improve flow properties, thus providing coatings which are free from thickness discontinuities and pinholes which have been a source of considerable concern in the prior art.

EXAMPLES 4–16

Essentially the procedure of Example 1 was followed to produce the compositions identified in Table III. Example 4A provides a control. Each of the powders gelled in about 8 seconds after contacting a steel bar at 205° C.

Table III

| Example: | 4A | 4 | 5 | 6 | 7 | 8 | 9 |
|---|---|---|---|---|---|---|---|
| Epoxy Resin A | 189.0g | 189.0 | 189.0 | 189.0 | 189.0 | 189.0 | 189.0 |
| Flow Control Agent ("Modaflow") | 1.5g | 1.5 | 1.5 | 1.5 | 1.5 | 1.5 | 1.5 |
| Copolymer I | — | 10.4 | — | — | — | — | — |
| II | — | — | — | — | — | — | — |
| III | — | — | 10.4 | — | — | — | — |
| IV | — | — | — | 10.4 | — | — | — |
| V | — | — | — | — | 20.8 | — | — |
| VI | — | — | — | — | — | 5.2 | 20.8 |
| Barium Sulfate (National Lead "Foam A") | 76.3g | 76.3 | 76.3 | 76.3 | 76.3 | 76.3 | 76.3 |
| Iron Oxide ("Mapico" Brown) | 6.3g | 6.3 | 6.3 | 6.3 | 6.3 | 6.3 | 6.3 |
| Stannous Octoate Catalyst | 2.0g | 2.0 | 2.0 | 2.0 | 2.0 | 2.0 | 2.0 |
| Trimellitic Anhydride | 26.3g | 26.3 | 26.3 | 26.3 | 26.3 | 26.3 | 26.3 |
| Impact Strength (Inch-lb.) P = Pass, F = Fail | P80<br>F120 | P80<br>F120 | P80<br>F120 | P80<br>F120 | P40<br>F80 | P40<br>F80 | p20<br>F40 |
| Bend Test Failure at 22° C for 2 or 3 bars | 20<br>15 | 15<br>10 | 15<br>10 | 15<br>10 | 15<br>10 | 15<br>10 | 15<br>10 |
| Bend Test Failure at −29° C | 30<br>20 | 15<br>15 | 30<br>20 | 20<br>15 | 10<br>10 | 10 | 15<br>15 |

Table III-continued

| | | | | | | | |
|---|---|---|---|---|---|---|---|
| for 2 or 3 bars | 20 | 15 | | | | | 15 |
| 60° C Cathodic Disbondment Test for | 2.9* | * = one extraneous blister | | | | | 3.1* |
| | 3.4 | | | | | | 3.2 |
| 3 Panels (dia. of disbondment in cm) | 2.2** | ** = two extraneous blisters | | | | | 3.2 |

| Example: | 10 | 11 | 12 | 13 | 14 | 15 | 16 |
|---|---|---|---|---|---|---|---|
| Epoxy Resin A | 189.0 | 189.0 | 189.0 | 189.0 | 189.0 | 189.0 | 189.0 |
| Flow Control Agent ("Modaflow") | 1.5 | 1.5 | 1.5 | 1.5 | 1.5 | 1.5 | 1.5 |
| Copolymer I | 10.4 | 10.4 | 10.4 | 5.2 | 5.2 | 10.4 | 10.4 |
| II | — | — | — | — | — | 10.4 | 15.6 |
| III | — | — | — | — | — | — | — |
| IV | — | — | — | — | — | — | — |
| V | 15.6 | 20.8 | 26.0 | 20.8 | 26.0 | — | — |
| VI | — | — | — | — | — | — | — |
| Barium Sulfate (National Lead "Foam A") | 76.3 | 76.3 | 76.3 | 76.3 | 76.3 | 76.3 | 76.3 |
| Iron Oxide ("Mapico" Brown) | 6.3 | 6.3 | 6.3 | 6.3 | 6.3 | 6.3 | 6.3 |
| Stannous Octoate Catalyst | 2.0 | 2.0 | 2.0 | 2.0 | 2.0 | 2.0 | 2.0 |
| Trimellitic Anhydride | 26.3 | 26.3 | 26.3 | 26.3 | 26.3 | 26.3 | 26.3 |
| Impact Strength (Inch-lb.) P = Pass, F = Fail | P20 F40 | P20 F40 | P20 F40 | P20 F40 | P20 F40 | P40 F80 | P20 F40 |
| Bend Test Failure at 22° C | 15 10 | 20 10 | 15 10 | 15 10 | 15 8 | 10 10 | 15 10 |
| for 2 or 3 bars | 8 | 8 | | | 8 | 10 | 10 |
| Bend Test Failure at −29° C | 15 10 | 15 15 | 15 10 | 15 10 | 15 10 | 10 10 | 20 20 |
| for 2 or 3 bars | | | 10 | 10 | | | 10 |
| 60° Cathodic Disbondment Test for | 3.2* | | | 2.3 | | | |
| 3 Panels (dia. of disbondment in cm) | 2.9 3.0 | | | 2.5 3.3 | | | |

EXAMPLE 17

To a stainless steel, jacketed reaction kettle equipped with agitator, temperature controller and nitrogen inlet were charged 195 parts by weight of Epoxy Resin B (preheated to 60° C), 87.3 parts of bisphenol A and 15.5 parts of Copolymer I. After heating to 100° C, 0.1 part of organo-substituted phosphine catalyst was added. Heating and mixing were continued until the temperature reached 150° C, at which point an exotherm carried the temperature to 200° C. With cooling, the temperature was held at 175°–205° C for 30 minutes. The resin temperature was reduced to 165° C, twp parts of flow control agent were added and mixing was continued another 15 minutes when the kettle was drained into shallow metal cooling trays. The epoxide equivalent weight of the epoxy resin was 1138, and its Durrans' softening temperature was about 95° C.

After grinding to a powder size of less than 100 mesh (U.S., 149-micrometer openings), 1610 g of this resin blend, 605 g of barium sulfate ("Foam A"), 50 g of iron oxide ("Mapico" brown) and 210 g of trimellitic anhydride were blended together and then charged to a water-cooled three-paddle mixer at 1000 rpm. Stannous octoate catalyst (25 g) was added with a syringe over a 2-minute period and mixing continued for another minute. This was extruded at 103° C, and chips of the extrusion were ground and sieved through No. 80 mesh screen (U.S., 180-micrometer openings). The powder gelled in 7 seconds after striking a steel plate at 205° C.

| Bend Test for 2 bars. | Both fail at 10 diameters. |
|---|---|
| Impact Test | |
| (160 in.-lb.) (1.8 kg-m) | Passed |
| 60°C Cathodic Disbondment Test for 2 panels | 1.9 cm 2.6 cm |

EXAMPLES 18–21

Powders of the following compositions were prepared essentially as in Example 1 as follows:

Examples 18–21

Powders of the following compositions were prepared essentially as in Example 1 as follows:

| Example: | 18A | 18 | 19 | 20 | 21 |
|---|---|---|---|---|---|
| Epoxy Resin A | 158 g | 158 g | 158 g | 158 g | 158 g |
| Flow Control Agent "Modaflow" | 1.5 | 1.5 | 1.5 | 1.5 | 1.5 |
| Copolymer I | 0 | 8.7 | 8.7 | 8.7 | 0 |
| Copolymer V | 0 | 0 | 4.4 | 8.7 | 8.7 |
| Barium Sulfate ("Foam A") | 75 | 75 | 75 | 75 | 75 |
| Iron Oxide ("Mapico" Brown) | 5 | 5 | 5 | 5 | 5 |
| 2,4,6-tris(dimethyl-aminomethyl)phenol | 1.6 | 1.6 | 1.6 | 1.6 | 1.6 |
| Dicyandiamide | 3.5 | 3.5 | 3.5 | 3.5 | 3.5 |

The powder of Comparative Example 18A gelled in 35 seconds after contacting a steel bar at 205° C whereas the powders of Examples 18–21 gelled in 37–40 seconds.

Four or five bars coated with the powders of each of Examples 18–21 were subjected to the Bend Test and one panel of each was subjected to the Impact Test, with results as reported in Table IV.

Table IV

| Example | Impact Test Pass (P) and Failure (F) in inch-lb. (kg-m) | Central Coating Thickness (mm) | Bend Test Failure (diameters) | Comments |
| --- | --- | --- | --- | --- |
| 18A | P80 (0.9) | .23 | 20 | 3 pinholes at 30D* |
|  | F120 (1.35) | .28 | 20 | 2 pinholes at 30D |
|  |  | .33 | 30 |  |
|  |  | .4 | 30 |  |
| 18 | P60 (0.7) | .2 | 10 |  |
|  | F80 (0.9) | .25 | 10 | 1 pinhole at 15D |
|  |  | .25 | 15 | 1 pinhole at 20D |
|  |  | .3 | 8 |  |
|  |  | .23 | 10 | 3 pinholes at 25D |
| 19 | P20 (0.2) | .23 | 20 |  |
|  | F40 (0.45) | .25 | 15 | 2 pinholes at 25D |
|  |  | .28 | 10 |  |
|  |  | .35 | 15 | 2 pinholes at 20D |
| 20 | P20 (0.2) | .23 | 15 |  |
|  | F40 (0.45) | .23 | 20 | 1 pinhole at 25D |
|  |  | .25 | 10 |  |
|  |  | .28 | 10 |  |
|  |  | .43 | 8 |  |
| 21 | P60 (0.7) | .2 | 20 | 3 pinholes at 30D |
|  | F80 (0.9) | .25 | 20 | 3 pinholes at 25D |
|  |  | .3 | 30 |  |
|  |  | .35 | 20 | 1 pinhole at 30D |
|  |  | .35 | 15 |  |

*Diameters

The relatively poor bendability provided by the powder of Example 21 is attributable to the high melt index (420–580) of Copolymer V which would preferably be used in combination with an ethylene-vinyl acetate copolymer of lower melt index.

I claim:

1. A homogeneous free-flowing powder which is shelf-stable and when heated to 185°–250° C in contact with a metal article fuses and then gels to provide a tough protective coating, said powder comprising
   a polyglycidyl ether of a polyhydric phenol having a softening point of 70°–150° C,
   a normally solid latent hardening agent for epoxy resin,
   a latent catalyst for accelerating reaction between the polyglycidyl ether and the hardening agent when melted together,
which powder is characterized by the feature that it incorporates per 100 parts of the polyglycidyl ether 3–30 parts by weight of one or more copolymers of monomers comprising by weight 2–50% vinyl acetate and 5–75% ethylene, which copolymer or copolymers have a melt index or combined melt index of 5–400 and impart extraordinarily good flexibility to cured coatings of the powder without undue effect upon other properties of the coatings.

2. A powder as defined in claim 1 wherein a said copolymer is a copolymer of 25–50 weight percent of vinyl acetate and 50–75 weight percent of ethylene.

3. A powder as defined in claim 1 wherein a said copolymer is also based on about 1 weight percent of acrylic acid or maleic acid.

4. A powder as defined in claim 1 wherein the composition includes 3–10 parts by weight of said copolymer or copolymers per 100 parts of the polyglycidyl ether.

5. A powder as defined in claim 1 wherein said one or more copolymers have a melt index or combined melt index of 20–200.

6. A dry shelf-stable powder as defined in claim 1, most of which will pass a screen having 180-micrometer openings.

* * * * *